Feb. 5, 1935. C. FARRIS 1,989,745
SIX-WHEEL MOTOR VEHICLE
Filed Dec. 15, 1930   2 Sheets-Sheet 2
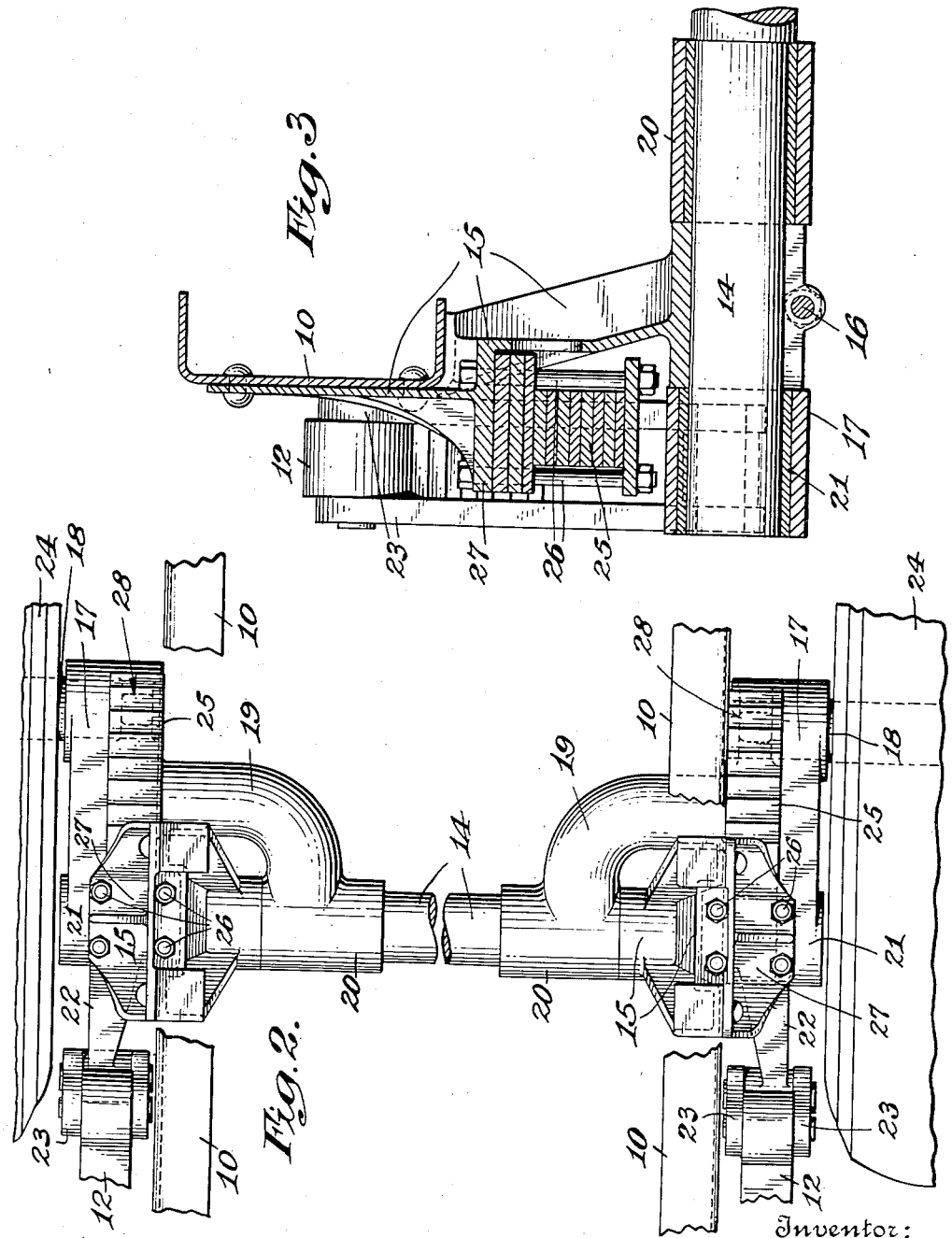
Inventor:
Clayton Farris
By his Attorneys
Redding, Greeley, O'Shea & Campbell Patented Feb. 5, 1935

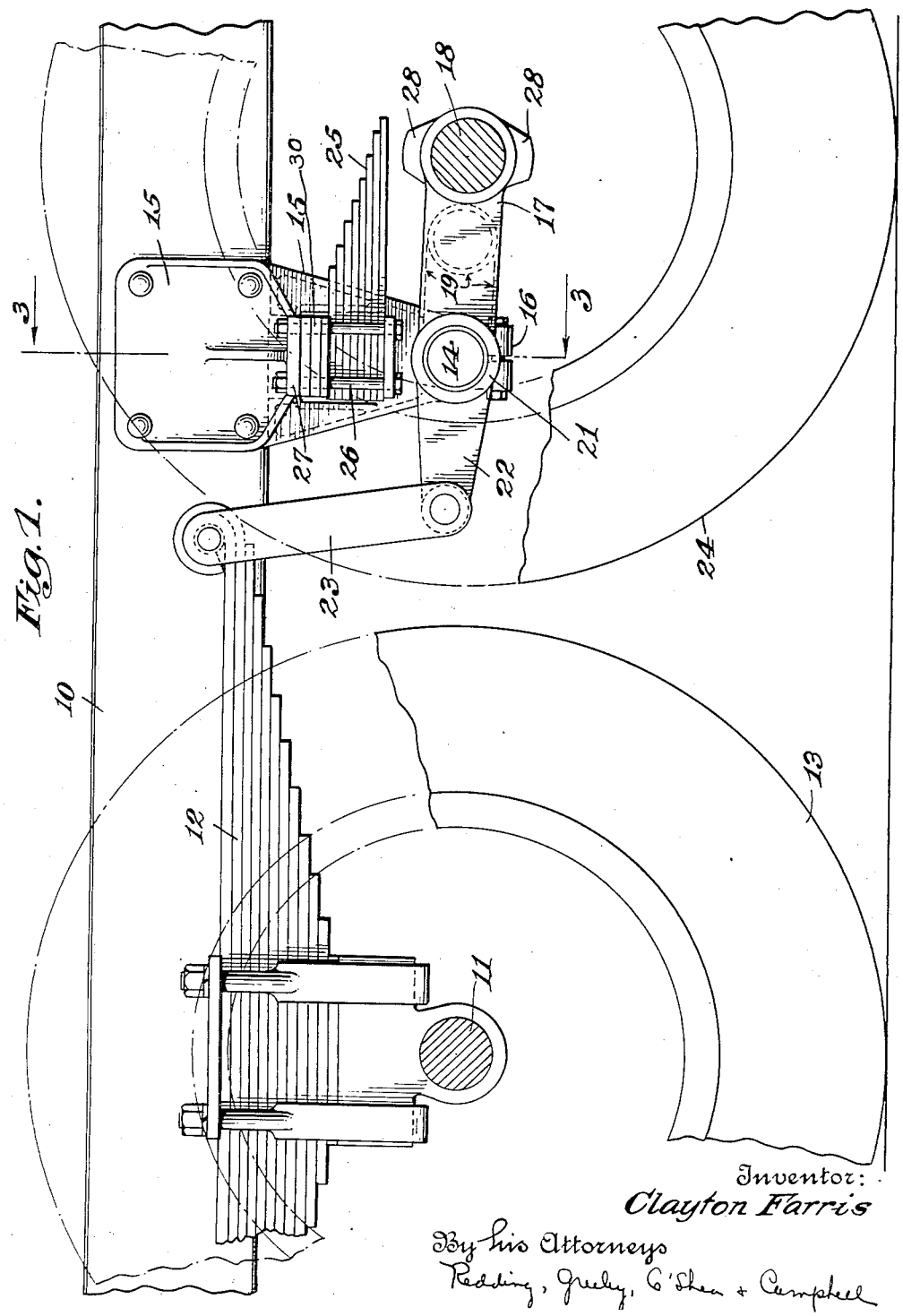

1,989,745

UNITED STATES PATENT OFFICE 1,989,745

SIX-WHEEL MOTOR VEHICLE

Clayton Farris, Newark, N. J.

Application December 15, 1930, Serial No. 502,463

10 Claims. (Cl. 280—104)

The present invention relates to six wheel motor vehicles and embodies, more specifically, an improved form of spring suspension for vehicles of this character more particularly where it is desired to convert a four wheel vehicle into a six wheeler without disturbing the standard chassis construction thereof.

More specifically, the invention embodies an improved mounting for four rear wheels, together with a spring suspension therefor which enables a predetermined increase in load to be apportioned in a desired ratio between the four rear wheels.

It is proposed, therefore, to provide a construction whereby additional idle load wheels may be added to a vehicle chassis having four wheels, the resulting wheel mountings being of such character as to apportion the vehicle load in any desired fashion upon the respective wheels. In order that the traction wheels may function properly under all conditions of load, the static load carried thereby is greater in proportion to the load assumed by the idle wheels than the ratio of the loads carried by these respective wheels at full load. Between light and full loads, this ratio decreases until, at full load, the idle wheels carry the maximum proportion.

An object of the invention, therefore, is to provide, in combination with the rear load and traction wheels of a motor vehicle, additional idle load wheels which may be applied without disturbing the conventional wheel and spring suspension of the vehicle.

A further object of the invention is to provide a wheel mounting of the above character wherein additional idle load wheels may be mounted upon the vehicle in such manner as to impress thereon a desired portion of the weight carried by the vehicle, such wheels also being flexibly mounted in such manner as to cooperate with the main traction wheels in assuming the vehicle load.

A further object is to provide a wheel mounting of the above character wherein the static vehicle load is carried by a traction and an idle wheel in such fashion that, under light loads, the traction wheel carries a greater portion of the load than the idle wheel, while under full load conditions, the portion of the load assumed by the idle wheel is materially increased.

A further object of the invention is to provide, as a unit, a pair of idle load wheels carried by a through beam and adapted to be mounted as a unit upon a standard vehicle chassis, a suitable shackle connection being provided between the standard vehicle rear springs and the respective idle load wheels cooperating therewith which are independently mounted upon the first mentioned beam.

Further objects, not specifically enumerated above, will be apparent as the invention is described in greater detail in connection with the accompanying drawings, wherein:

Figure 1 is a view in side elevation, showing a wheel mounting and spring suspension of the above character.

Figure 2 is a plan view of the idle load wheels and mounting means therefor.

Figure 3 is a view in section, taken on line 3—3 of Figure 1, and looking in the direction of the arrows.

Referring to the above drawings, the side frame members of a motor vehicle chassis are indicated at 10 and the standard rear axle at 11. This axle is mounted in any well known manner upon the main rear vehicle springs 12 and drives traction wheels 13. Since the invention is not concerned with these specific elements, further detailed description thereof is deemed unnecessary herein and the specific idle load wheel mounting will now be described.

With reference to Figures 1 and 2, a through beam is shown at 14 as secured to the side frame members 10 by means of brackets 15. These brackets extend downwardly and are secured to the through beam at 16. This beam constitutes a cross truss and journals rocker arms 17 at either end thereof, stub axles 18 being carried by the ends of the rocker arms.

L-shaped extensions 19 are formed on the rocker arms and are provided with sleeves 20 which are journaled upon the beam 14. The rocker arms are journaled at 21 upon the through beam and upon the opposite side of bracket 15 from the sleeves 20.

Extending upon the opposite sides of the through beam from the arms 17 are arms 22 which are connected to the adjacent ends of springs 12 by means of links 23. In this manner the springs 12 are shackled to the arms 22 and the weight carried by the springs is thus distributed between the axle 11 and the stub axle 18 at either side of the vehicle. Idle load wheels 24 are journaled on the stub axles 18 and their movement is thus unrestricted with respect to wheels 13.

To cushion movement of the stub axles beyond a predetermined extent an auxiliary spring 25 is provided and is clamped upon the bracket 15 by means of bolts 26, a horizontal land 27 being formed on the bracket to facilitate such mounting. Bosses 28 are formed upon opposite sides of the ends of arms 17 and are adapted to engage the auxiliary spring upon such predetermined movement. By providing these bosses upon opposite sides of the arms, the arms may be used interchangeably upon either side of the frame.

When the vehicle weight is light, approximately 67 percent of the rear axle load is carried by the traction wheels 13 to provide sufficient traction for driving. When the vehicle is fully loaded, fifty percent of the rear axle load is carried by each wheel. At a predetermined vehicle load, the boss 28 engages the auxiliary spring to cause the latter to assume a greater share of the load. In this manner, the auxiliary spring comes in progressively between light and full loads so that the apportionment of weight on the traction wheels varies progressively. This is by reason of the fact that the pivot of the arm 17 is eccentric with respect to the deflection curve of the end of the cooperating auxiliary spring and the boss 28 therefore rides down the spring as the load comes on to shorten the load arm. The desired apportionment of weight is effected by properly constructing the lengths of the respective arms 22 and 17, varying the thickness or width of the leaves of the auxiliary spring, varying the number of leaves of the auxiliary spring, or varying the distance from the top of the boss 28 to the bottom of the auxiliary spring. This last named adjustment is made possible by the use of suitable spacers 30.

It will thus be seen that the idle wheels may be readily added to a standard vehicle construction without disturbing the elements thereof. The construction is such as to readily lend itself to efficient manufacture and maintenance and is highly flexible in assuming the vehicle weight. While the invention has been described with specific reference to the accompanying drawings, it is not to be limited, save as defined in the appended claims.

I claim as my invention:

1. In combination with a vehicle chassis having a driving wheel and a spring for mounting the wheel thereon, an idle load wheel, a bracket on the chassis, an arm having an L-shaped portion journaled upon opposite sides of the bracket, said arm journaling the idle load wheel, an extension on the arm, a link connecting the extension with the spring, and a spring on the chassis to cushion movement of the arm.

2. In combination with a vehicle chassis having a driving wheel and a spring for mounting the wheel thereon, an idle load wheel, a bracket on the chassis, an arm having an L-shaped portion journaled upon opposite sides of the bracket, said arm journaling the idle load wheel, an extension on the arm, a link connecting the extension with the spring, a spring carried by the bracket, and a boss on the arm adapted to be engaged by the spring when the vehicle is loaded a predetermined amount.

3. As an article of manufacture, an arm for mounting a wheel on a vehicle frame, said arm having a bearing about which it is adapted to turn and bosses forming spring bearing pads symmetrically disposed upon opposite sides of the arm at one end thereof and lying in a circle concentric with the bearing.

4. In combination with a vehicle chassis, a traction wheel, an idle load wheel, a spring for mounting the traction wheel on the chassis, means connecting the idle wheel to the spring for mounting the same upon the chassis, a second spring, and means to mount the second spring to take a portion of the load of the idle load wheel, said last named means and second spring being so formed and positioned as to impress a greater portion of the static vehicle load upon the traction wheel than upon the idle wheel when the chassis load is light.

5. In combination with a vehicle chassis, a traction wheel, an idle load wheel, a spring for mounting the traction wheel on the chassis, means connecting the idle wheel to the spring for mounting the same upon the chassis, a second spring, and means to mount the second spring to take a portion of the load of the idle load wheel, said last named means and second spring being so formed and positioned as to impress a greater portion of the static vehicle load upon the traction wheel than upon the idle wheel when the chassis load is light, and means responsive to increases in load to impress an increasingly greater proportion of the load upon the idle wheel as the chassis load increases.

6. In combination with a vehicle chassis having a driving wheel and a spring for mounting the wheel thereon, an idle load wheel, a bracket on the chassis, an arm journaled upon the bracket, said arm journaling the idle load wheel, an extension on the arm, a link connecting the extension with the spring, and a spring carried by the bracket, said spring being adapted to engage the arm when the vehicle is loaded a predetermined amount.

7. In combination with a vehicle chassis a traction wheel, an idle load wheel, a spring between the traction wheel and chassis, means connecting the spring and idle load wheel, a second spring independent of the connecting means, and means to mount the second spring to take a portion of the load of the idle load wheel, the second spring and last named mounting means being so positioned and of such construction as to be responsive to changes in the load to apportion the static vehicle load between the wheels with provision for varying the ratio of the load carried by the respective wheels for at least a portion of the time during which the load varies.

8. In combination with a vehicle chassis, a traction wheel, an idle load wheel, a spring between the traction wheel and chassis, means connecting the spring and idle load wheel, a second spring independent of the connecting means, and means to mount the second spring to take a portion of the load of the idle load wheel, the second spring and last named mounting means being so positioned and of such construction as to be responsive to changes in the load to apportion the static vehicle load between the wheels with provision for varying the ratio of the load carried by the respective wheels progressively for at least a portion of the time during which the load varies.

9. In combination wth a vehicle chassis, a traction wheel, an idle load wheel, a spring between the traction wheel and chassis, means connecting the spring and idle load wheel, a second spring independent of the connecting means, and means to mount the second spring to take a portion of the load of the idle load wheel, the second spring and last named mounting means being so positioned and of such construction as to be responsive to changes in the load to apportion the static vehicle load between the wheels with provision for decreasing the ratio of the load carried by the traction wheel to that carried by the idle load wheel for at least a portion of the time during which the vehicle load increases.

10. In combination with a vehicle chassis, a traction wheel, an idle load wheel, a spring between the load wheel and chassis, means connecting the spring and idle load wheel, a second spring independent of the connecting means, and means to mount the second spring to take a portion of the load of the idle load wheel, the second spring and last named mounting means being so positioned and of such construction as to be responsive to changes in the load to impress a greater proportion of the static vehicle load upon the traction wheel at light vehicle loads than under heavy loads.

CLAYTON FARRIS.